US005556972A

United States Patent [19]

Keulemans et al.

[11] Patent Number: 5,556,972

[45] Date of Patent: Sep. 17, 1996

[54] COUNTER CURRENT DRY FRACTIONAL CRYSTALLIZATION

[75] Inventors: Cornelis N. M. Keulemans, Rozenburg; Christiaan E. Van den Oever, Bergschenhoek, both of Netherlands

[73] Assignee: Van den Bergh Foods Co., Division of Conopco, Inc., Lisle, Ill.

[21] Appl. No.: 470,644

[22] Filed: Jun. 6, 1995

Related U.S. Application Data

[63] Continuation of Ser. No. 288,138, Aug. 9, 1994, abandoned, which is a continuation of Ser. No. 971,718, Nov. 4, 1992, abandoned, which is a continuation of Ser. No. 795,243, Nov. 15, 1991, abandoned, which is a continuation of Ser. No. 524,612, May 17, 1990, abandoned.

[30] Foreign Application Priority Data

May 23, 1989 [GB] United Kingdom .................. 8911819

[51] Int. Cl.[6] ................................ C11B 7/00; C09F 5/10

[52] U.S. Cl. .......................... 554/211; 554/208; 210/770

[58] Field of Search .................................. 554/208, 211, 554/169; 23/295, 296; 210/770

[56] References Cited

U.S. PATENT DOCUMENTS

| | | | |
|---|---|---|---|
| 2,147,222 | 2/1939 | Treub | 23/296 |
| 4,087,564 | 5/1978 | Poot et al. | 426/603 |
| 4,360,536 | 11/1982 | Keuning et al. | 426/606 |
| 4,510,167 | 4/1985 | Schmidt et al. | 426/607 |
| 4,594,194 | 6/1986 | Dieffenbacher | 260/428 |
| 4,795,569 | 1/1989 | Hoguchi et al. | 210/770 |
| 4,960,544 | 10/1990 | Van Putte et al. | 260/420 |
| 5,401,867 | 3/1995 | Sitzmann et al. | 554/211 |

FOREIGN PATENT DOCUMENTS

| | | |
|---|---|---|
| 0089082 | 8/1983 | European Pat. Off. . |
| 2048928 | 12/1980 | United Kingdom . |

OTHER PUBLICATIONS

A. E. Thomas III, "Fractionation and Winterization", Processes and Products, Chapter 1 in *Bailey's Industrial Oil and fat Products*, T. H. Applewhite Ed., 1985 Wiley, New York, NY, pp. 1–39.

H. Hinnekens, "Le Fractionnement des Corps gras sans sorbent", Ch. 9 in Symposium International–La filtation dams le raffinage, le fractionnement des corps gras, 1976.

van Putte, K. P. A. M. et al. "Crystallization Kinetics of Palm Oil", JAOCS, vol. 64 No. 8 (Aug. 1987), pp.1138–1143.

(List continued on next page.)

*Primary Examiner*—Asok Pal
*Assistant Examiner*—Bekir L. Yildirim
*Attorney, Agent, or Firm*—Rimma Mitelman

[57] ABSTRACT

The invention relates to a method for dry fractionation of fatty substances by a counter current dry fractionation operation, comprising at least two dry fractional crystallization treatments;

a first dry fractional crystallization treatment comprising the steps of:
1a) dry fractionating by crystallization the fatty substances into a higher melting first stearin fraction and a lower melting first olein fraction;
1b) separating the first stearin fraction from the first olein fraction by membrane filter pressing; and
1c) feeding the separated first olein fraction to a second dry fractional recrystallization treatment; and a second dry fractional crystallization treatment comprising the steps of:
2a) dry fractionating by crystallization the first olein fraction into a higher melting second stearin fraction and a lower melting second olein fraction;
2b) separating the second stearin fraction from the second olein fraction by membrane filter pressing; and
2c) feeding the separated second stearin fraction to the first dry fractional crystallization treatment.

6 Claims, 1 Drawing Sheet

OTHER PUBLICATIONS van den Oever, Ir. C.E. "Fractionated Cristallization of Edible Oils and Fats", Proceedings of a Symposium: Modern Separation methods, Delft University of Technology, Oct. 25, 1988, pp. 15–27.

van den Enden, J. C., et al. "A Method for the Determination of the Solid Phase Content of Fats Using Pulse Nuclear Magnetic Resonance", Fette, Seifen, Anstrichmittel, 80 Jahrgang, No. 5, 1978, pp. 180–186.

European Search Report.

H. Traitler, "Palm Oil and Palm Kernal Oil in Food Products", JAOCS, vol. 62, No. 2 (Feb. 1985), pp. 417–421.

Belgian Filtration Society International Symposium Entitled Filtration in the Refining and Fractionation of Oils and fats, Apr. 1976;"Chapter 9 Entitled Le Fractionnement Des Corps Gras Sans Solvant" By H. Hinnekens.Copy of Article and Translation.

Deffense, Etenne et al., "Fraccionamiento: una tecnologia futurista", Nov. 27–30, 1988, Guadalajara, Jal. Mexico.

Deffense, Etienne et al., "Fractionation: a fast growing technology" presented at Fats for the Future II, Auckland, New Zealand, Feb. 12–17, 1989, and at 80th American Oil Chemists' Society Annual Meeting, Cincinnati, USA, May 3–7, 1989.

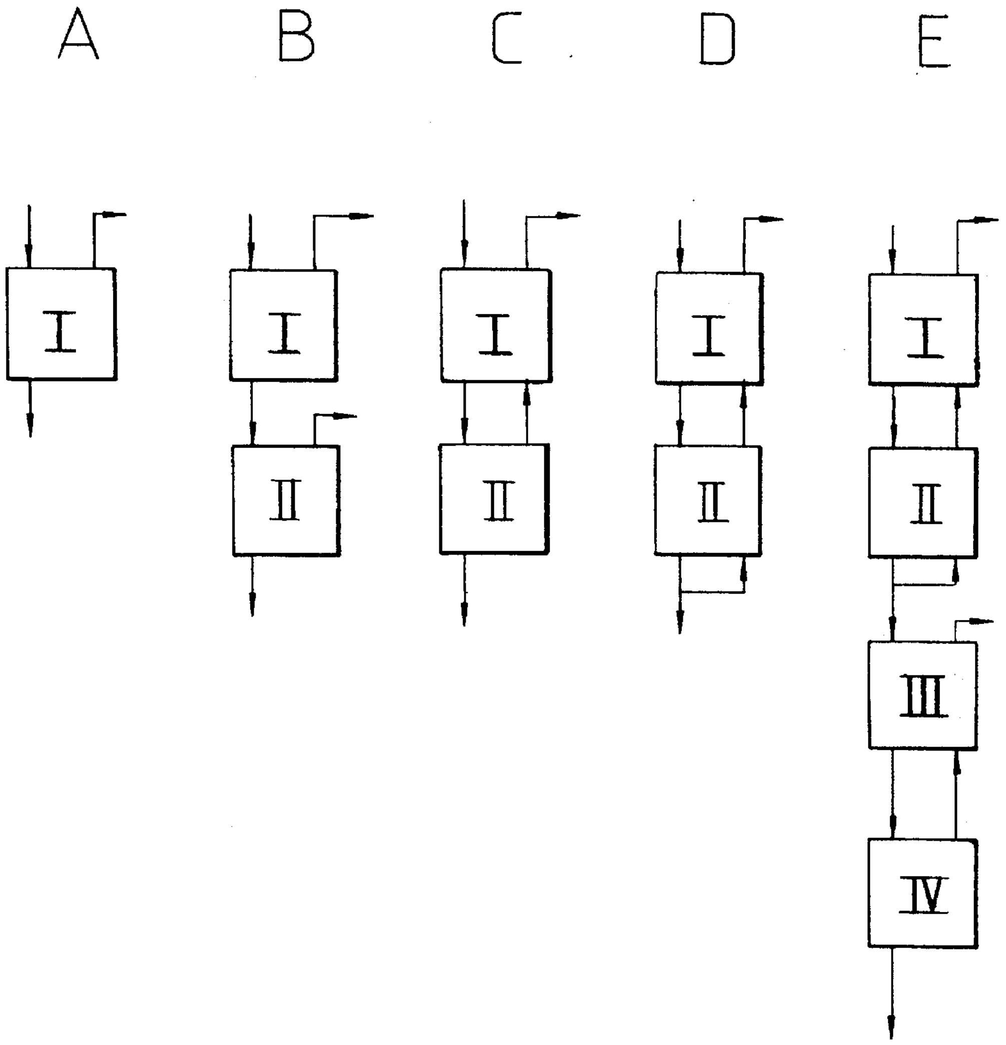
A
B
C
D
E
I
I
II
I
II
I
II
I
II
III
IV

COUNTER CURRENT DRY FRACTIONAL CRYSTALLIZATION

This is a continuation of Ser. No. 08/288,183, filed Aug. 9, 1994, now abandoned which is a continuation of Ser. No. 07/971,718 filed Nov. 4, 1992, now abandoned which is a continuation of Ser. No. 07/795/243, filed Nov. 15, 1991, now abandoned which is a continuation of Ser. No. 07/524,612 filed may 17, 1990, now abandoned.

BACKGROUND OF THE INVENTION

The present invention relates to a method for dry fractional crystallization of fatty substances, including fats and glyceride oils. In particular, the invention relates to the separation of fatty substances in a multi-stage dry fractional crystallization process, in which a high melting fraction obtained in a dry fractional crystallization treatment is recycled to an earlier dry fractional crystallization treatment.

Natural glyceride oils and fats comprise a great many different triglycerides, the physical properties of which to a large extent are determined by the chain lengths and the degrees of unsaturation of the fatty acid moieties. To make natural glyceride oils and fats more suitable for particular applications it is often required to separate them into fractions characterized by fatty acid glyceride distributions which are more homogeneous with respect to the melting behaviour.

For instance, fat blends suitable for producing margarine having a relatively high ratio of poly-unsaturated to saturated fatty acids comprise triglycerides with a specific $M_3/H_2M$ ($M_3$ are triacylglycerols containing saturated fatty acid residues with 12 or 14 carbon atoms exclusively; $H_2M$ are triacrylglycerols containing saturated fatty acid residues of which two have 16 or 18 carbon atoms and one has 12 or 14 carbon atoms) ratio imparting to margarine good organoleptic properties and suitable consistency at a temperature within the range of 15°–25° C. (see European patent application 89,082).

In the book "Bailey's Industrial Oil and Fat Products" Volume 3, page 5–37 (1985) commercial dry fractionation processes are disclosed in which the oil is cooled to a temperature at which only a higher melting triglyceride fraction crystallizes, followed by separation of the crystallized solids and the liquid fraction, e.g. by filtration or centrifugation.

A multi-stage counter current solvent fractionation process is disclosed in U.S. Pat. No. 2,147,222, in which process a solid phase obtained in a crystallization treatment is passed to the next separation treatment, from which the liquid phase is passed to the former crystallization treatment. This transport of intermediate products is indicated by the term "counter current".

Although solvent fractionation processes involve relatively high capital costs, up to now counter current dry fractionation has not been used on an industrial scale, because conventional separation techniques, such as filtration and centrifugation, possess relatively low separation efficiencies. A high separation,efficiency is required to warrant an effective dry fractionation, because the amounts of the mutually counter current fractions determine the properties and the amounts of the products obtained in the dry fractionation. Finally, counter current dry fractionation is a process more difficult to control because of its complexity.

SUMMARY OF THE INVENTION

The present invention is based on the finding that counter current dry fractionation is feasible on an industrial scale when membrane filter presses are used in the separation operation, resulting in much higher separation efficiencies. Although the separation of dry crystallized fatty materials using a membrane filter press was disclosed more than ten years ago (H. Hinnekens, "Le fractionnement des corps gras sans solvant", chapter 9 in Symposium International—La filtration dans le raffinage, le fractionnement des corps gras, 1976), it was not recognized up to now that using membrane filter presses, counter current dry fractional crystallization is feasible on an industrial scale.

It has now been found that using a membrane filter press in a multi-stage counter current dry fractionation method, stearin fractions, olein fractions and/or mid fractions may be obtained in a higher yield and improved quality, and that oils having a relatively high solids content on fractionation may be fractionated, which oils due to these solids were difficult to fractionate in a conventional manner.

Accordingly, the present invention provides a method for dry fractionation of fatty substances by a counter current dry fractionation operation, comprising at least two dry fractional crystallization treatments;

a first dry fractional crystallization treatment comprising the steps of:

1a) dry fractionating by crystallization the fatty substances into a higher melting first stearin fraction and a lower melting first olein fraction;

1b) separating the first stearin fraction from the first olein fraction by membrane filter pressing; and 1c) feeding the separated first olein fraction (obtained in step 1b) to a the second dry fractional recrystallization treatment; and the second dry fractional crystallization treatment comprising the steps of:

2a) dry fractionating by crystallization the first olein fraction into a higher melting second stearin fraction and a lower melting second olein fraction;

2b) separating the second stearin fraction from the second olein fraction by membrane filter pressing; and 2c) feeding the separated second stearin fraction to the first dry fractional crystallization treatment.

According to the method of the present invention the olein fraction obtained after dry fractional crystallization of the starting fatty material and separation by membrane filter pressing is subjected to a similar dry fractional crystallization treatment at a lower crystallization temperature and the stearin fraction obtained is recycled to the first dry fractional crystallization treatment and mixed with the starting fatty material.

If the first olein fraction subjected to the second dry fractional crystallization treatment according to the invention comprises a relatively high solids content, it is preferred that the second olein fraction is at least partly recycled and mixed with the first olein fraction to be dry fractionated in the second dry fractional crystallization treatment whereby the first olein fraction is diluted, preferably the recycling ratio for the olein fraction is about 10–60%, more preferably 25–50%.

The method for counter current dry fractionation according to the invention may be used in the topping or bottoming section of a multi-stage dry fractionation process in which mid fractions are produced. When mid fractions are to be produced it is preferred that the olein fraction used as a feed for the dry fractional crystallization treatment that provides the mid fraction, is subjected to a second counter current dry fractional operation comprising at least two dry fractional crystallization treatments:

a third dry fractional crystallization treatment comprising the steps of:

3a) dry fractionating by crystallization the second olein fraction into a higher melting third stearin fraction and a lower melting third olein fraction;

3b) separating the third stearin fraction from the third olein fraction by membrane filter pressing; and 3c) feeding the separated third olein fraction to fourth dry fractional crystallization treatment; and the fourth dry fractional crystallization treatment comprising the steps of:

4a) dry fractionating by crystallization the third olein fraction into a higher melting fourth stearin fraction and a lower melting fourth olein fraction;

4b) separating the fourth stearin fraction from the fourth olein fraction by membrane filter pressing; and 4c) feeding the separated fourth stearin fraction obtained step 4b to the third dry fractional crystallization treatment.

An optimal multi-stage counter current dry fractionation method is obtained if the separation efficiency by membrane filter pressing is higher than 0.4, preferably the separation efficiency is higher than about 0.5, most preferred as high as possible (0.5–0.85).

The multi-stage dry fractionation method according to the invention is applicable to both batch and continuous methods of crystallization. The process is suitable for the dry fractionation of all semi-solid fatty substances from which a significant solid fraction has to be separated. It is particularly suitably applied to the fractionation of semi-solid glyceride oils and fats of vegetable, animal or marine origin, such as palm oil, palm kernel oil, tallow, butter fats, fish oils and mixtures thereof. These oils and fats may be partially hardened, pre-fractionated and/or inter-esterified. The method according to the invention is advantageously suitable for the production of hardstocks as starting materials for the production of margarine and spreads having an increased ratio of poly-unsaturated fatty acids to saturated fatty acids, and superior organoleptic properties.

The counter current dry fractionation method according to the invention will be illustrated hereafter in comparison to dry fractionation processes according to the prior art. The various processes are shown in the annexed single drawing, in which each box refers to a dry fractional crystallization treatment comprising dry fractionation in a crystallizer and separation of the stearin fraction from the olein fraction using a membrane filter press.

It is possible to carry out the multi-stage process of dry fractional crystallization in one crystallizer and with several storage tanks in which the olein and stearin fractions are temporarily stored, in a batchwise embodiment.

BRIEF DESCRIPTION OF THE DRAWING

The drawing illustrates various dry fractionation processes.

Methods A and B are not according to the invention, because of the absence of a counter current recycling of the stearin fraction obtained in the second dry fractional crystallization treatment. Methods C, D and E are according to the invention and in methods D and E there is a partial recycling of the second olein fraction. Process E is specifically designed for the production of mid fraction.

DESCRIPTION OF THE INVENTION

The following abbreviations have been used in the Examples:

$S_3$ are triacylglycerols containing saturated fatty acid residues exclusively.

$S_2O$ are triacylglycerols containing two saturated fatty acid residues and one unsaturated fatty acid residue with one double bond.

SPC is the solid phase contact in the crystallized fat as measured by pulse NMR.

SE denotes separation efficiency and is the solid phase content of the stearin after pressing as measured by pulse NMR.

T is temperature.

Numerals I, II, III and IV refer to dry fractional crystallization treatments I, II, III and IV, respectively.

Experiment 1

Neutralized and bleached palm oil having the following composition: $S_3$: 9.0%; $S_2O$: 41.0%; remainder: 50.0%, was heated to 70° C. to achieve complete liquidity. Subsequently, the liquid palm oil was dry fractionated in crystallization methods A, B, C, and D of which the process conditions and the composition and yield of the olein fraction and of the stearin fraction obtained in the first dry fractional crystallization treatment are summarized in table I.

Table I clearly shows that in the olein fraction obtained in the methods C and D according to the invention the $S_2O$ content increases and the $S_3$ content remains constant, whereas the olein yield increases notably. These olein fractions according to the invention are very suitable for use in margerine, because the increased $S_2O$ content at a constant $S_3$ content imparts superior organoleptic properties and hardness at room temperature to the margarine.

The stearin fraction obtained in methods C and D according to the invention shows an increased $S_3$ content and a lower $S_2O$ content. This stearin fraction is suitable as a raw material for triglyceride mixtures rich in palmatic moieties.

A comparison of methods C and D shows that by recycling the second olein fraction a feedstock with a relatively high solids content may be dry fractionated in a counter current process.

Experiment 2

A hardstock comprising a mixture of partly hardened and inter-esterified palm oil and palm kernel oil was neutralized and bleached and heated to complete liquidity. The hardstock comprised 18.3% $H_3$ and 38.6% $H_2M$. This hardstock was dry fractionated under such conditions, that the $H_2M$ content was as high as possible in order to improve the structure of the margerine.

The process conditions and composition of the olein and stearin fractions obtained, and the stearin yield, are reviewed in table Ii for the prior art methods A and B and method C according to the invention.

Table II clearly shows that method C according to the invention provides an olein fraction having the highest $H_2M$ content, and is very suitable for use in the production of margarine hardstock.

Experiment 3

A similar hardstock as used in experiment 2 was used. This hardstock comprised 17% $H_3$ and 40% $H_2M$. This hardstock was dry fractionated such that the $H_3$ content is about 12%, and the $H_2M$ content was as high as possible. Accordingly, a mid fraction was obtained imparting superior properties to the margarine and spreads comprising it.

The process conditions and composition of the olein and stearin fractions are reviewed in table III for the counter current dry fractional crystallization method E according to the invention. The mid fraction yield of process E (olein III) is 38%.

It is noted that a fractionation similar to the method B is not feasible under experimental conditions, because in the second fractionation treatment about 28% of solids formed during crystallization should be separated. Such a separation of this type of fractions appears to be impossible at a sufficient separation efficiency.

Experiment 4

A similar hardstock as used in experiment 2 was used. This hardstock comprised 15.8% $H_3$ and 39.6% $H_2M$.

This hardstock was dry fractionated such that the $H_3$ content was about 24% and the $H_2M$ content was as high as possible. Accordingly, a stearin was obtained imparting superior properties to the margarines and spreads comprising it.

The process conditions and composition of the olein and stearin fractions are reviewed in table IV for the prior art method B and method C according to the invention.

Table IV clearly shows that method C according to the invention provides a stearin fraction having a higher $H_2M$ content, and is very suitable for use in the production of margarine hardstock.

TABLE I

| Conditions + | Dry fractional crystallization process | | | |
|---|---|---|---|---|
| Composition | A | B | C | D |
| $T_I$ (°C.) | 24.5 | 38 | 38 | 38 |
| $T_{II}$ (°C.) | — | 24.5 | 24.5 | 24.5 |
| $SE_I$ | 0.5 | 0.5 | 0.5 | 0.5 |
| $SE_{II}$ | — | 0.5 | 0.5 | 0.5 |
| $SPC_I$ | 12.8 | 5.7 | 8.5 | 8.5 |
| $SPC_{II}$ | — | 7.1 | 7.4 | 6.6 |
| Olein | | | | |
| $S_3$ | 0.9 | 0.9 | 0.9 | 0.9 |
| $S_2O$ | 42.1 | 42.3 | 43.6 | 43.6 |
| yield (%) | 74.5 | 76.1 | 80.7 | 80.7 |
| Stearin | | | | |
| $S_3$ | 33.0 | 35.0 | 43.7 | 43.7 |
| $S_2O$ | 37.5 | 36.5 | 29.6 | 29.7 |

TABLE II

| Conditions + | Dry fractional crystallization process | | |
|---|---|---|---|
| Composition | A | B | C |
| $T_I$ (°C.) | 41.6 | 43.3 | 43.4 |
| $T_{II}$ (°C.) | — | 41.4 | 40.5 |
| $SE_I$ | 0.5 | 0.5 | 0.5 |
| $SE_{II}$ | — | 0.5 | 0.5 |
| $SPC_I$ | 15.7 | 8.6 | 12 |
| $SPC_{II}$ | | 8.6 | 12 |
| Olein | | | |
| $H_3/H_2M$ | 10.0/39.4 | 9.2/39.7 | 6.9/40.6 |
| Stearin | | | |
| $H_3/H_2M$ | 36.6/37.0 | 37.8/36.6 | 42.4/34.7 |
| yield (%) | 31.5 | 31.5 | 31.5 |

TABLE III

| Conditions + Composition | Dry fractional cystallization process E |
|---|---|
| $T_I$ (°C.) | 45 |
| $T_2$ (°C.) | 41 |
| $T_3$ (°C.) | 36 |
| $T_4$ (°C.) | 32.5 |
| $SE_I$ | 0.5 |
| $SE_{II}$ | 0.5 |
| $SE_{III}$ | 0.52 |

TABLE III-continued

| Conditions + Composition | Dry fractional cystallization process E |
|---|---|
| $SE_{IV}$ | 0.52 |
| $SPC_I$ | 11 |
| $SPC_{II}$ | 11 |
| $SPC_{III}$ | 18 |
| $SPC_{IV}$ | 18 |
| Olein I | 12/43 |
| Olein II | 7/42 |
| Olien III | 3/40 |
| Olein IV | 2/30 |
| Stearin I | 47/36 |
| Stearin II | 31/48 |
| Stearin III | 12/55 |
| Stearin IV | 4/48 |

TABLE IV

| Conditions + | Dry fractional crystallization process | |
|---|---|---|
| Composition | B | C |
| $T_I$ (°C.) | 38 | 37 |
| $T_{II}$ (°C.) | 33 | 32 |
| $SE_I$ | 0.5 | 0.5 |
| $SE_{II}$ | 0.5 | 0.5 |
| $SPC_I$ | 19.5 | 19.5 |
| $SPC_{II}$ | 19.5 | 19.5 |
| Olein | | |
| $H_3/H_2M$ | 24/44 | 24/48 |
| yield (%) | 63 | 64 |

What is claimed is:

1. A method for dry fractionation of fatty substances by a counter current dry fraction operation, to obtain a stearin fraction and an olefin fraction, the method comprising:

(a) dry fractionating by crystallization the fatty substances into a higher melting first stearin fraction and a lower melting first olefin fraction;

(b) separating the first stearin fraction from the first olefin fraction by membrane filter pressing;

(c) dry fractionating by crystallization the first olefin fraction obtained in step (b) into a higher melting second stearin fraction and a lower melting second olefin fraction;

(d) separating the second stearin fraction from the second olefin fraction by membrane filter processing; and (e) adding the separated second stearin fraction obtained in step (d) to the fatty substance in step (a);

wherein the second olefin fraction obtained in step (d) is at least partly recycled to step (c) and mixed with the first olefin fractions resulting from step (b); and wherein the percent recycle for the second olefin fraction is about 10–60% and wherein the separation efficiency by a membrane filter pressing is higher than 0.4.

2. Method as claimed in claim 1 further comprising subjecting the part of the second olein fraction obtained in step (d), which is not recycled, to a second counter current dry fractional operation comprising:

(f) dry fractionating by crystallization the second olein fraction into a higher melting third stearin fraction and a lower melting third olein fraction;

(g) separating the third stearin fraction from the third olein fraction by membrane filter pressing;

(h) dry fractionating by crystallization the third olein fraction obtained in step (g) into a higher melting fourth stearin fraction and a lower melting fourth olein fraction;

(i) separating the fourth stearin fraction from the fourth olein fraction by membrane filter pressing; and (j) feeding the separated fourth stearin fraction obtained in step (i) to step (f).

3. Method as claimed in claim 2, wherein the fourth olein fraction is partly recycled and mixed with the third olein fraction to be dry fractionated in step (h).

4. Method as claimed in claim 1, wherein the separation efficiency by membrane filter pressing is higher than 0.5.

5. Method as claimed in claim 1, wherein the percent recycle for the second olein fraction is about 25–50%.

6. A method for dry fractionation of fatty substances by a counter current dry fractionation operation, to obtain a stearin fraction and an olein fraction, the method comprising:

(a) dry fractionating by crystallization the fatty substances into a higher melting first stearin fraction and a lower melting first olein fraction;

(b) separating the first stearin fraction from the first olein fraction by membrane filter pressing;

(c) dry fractionating by crystallization the first olein fraction obtained in step (b) into a higher melting second stearin fraction and a lower melting second olein fraction;

(d) separating the second stearin fraction from the second olein fraction by membrane filter pressing;

(e) adding the separated second stearin fraction obtained in step (d) to the fatty substances in step (a);

(f) dry fractionating by crystallization the second olein fraction obtained in step (d) into a higher melting third stearin fraction and a lower melting third olein fraction;

(g) separating the third stearin fraction from the third olein fraction by membrane filter pressing;

(h) dry fractionating by crystallization the third olein fraction obtained in step (g) into a higher melting fourth stearin fraction and a lower melting fourth olein fraction;

(i) separating the fourth stearin fraction from the fourth olein fraction by membrane filter pressing; and (j) feeding the separated fourth stearin fraction obtained in step (i) to step (f);

wherein the fourth olein fraction obtained in step (i) is partly recycled and mixed with the third olein fraction resulting from step (g).

* * * * *